(No Model.)
W. JORDAN & E. BROADBRIDGE, Jr.
ILLUMINATING DEVICE FOR STAGE SCENERY AND FOR OTHER PURPOSES.
No. 482,362. Patented Sept. 13, 1892.
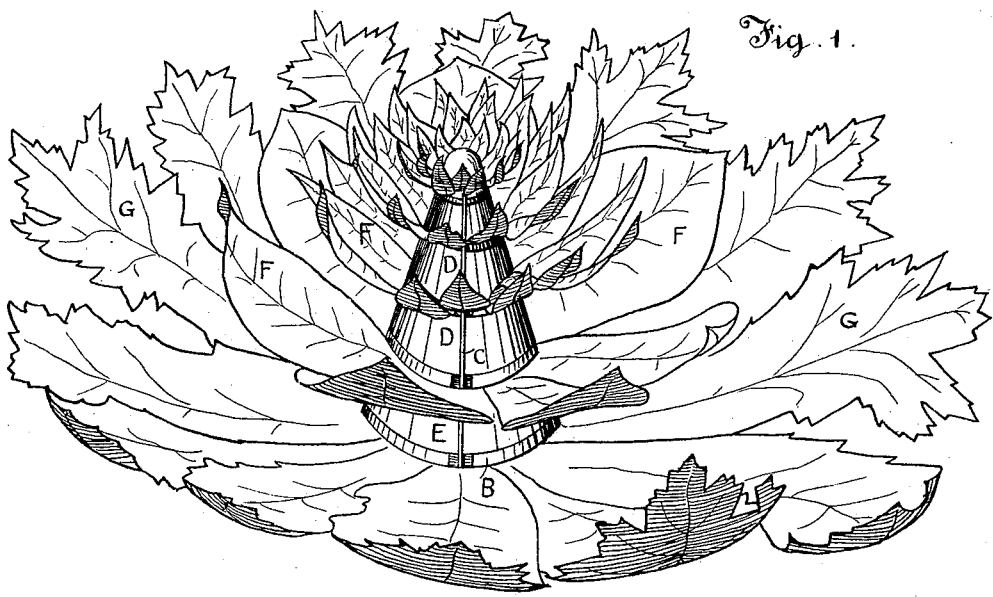
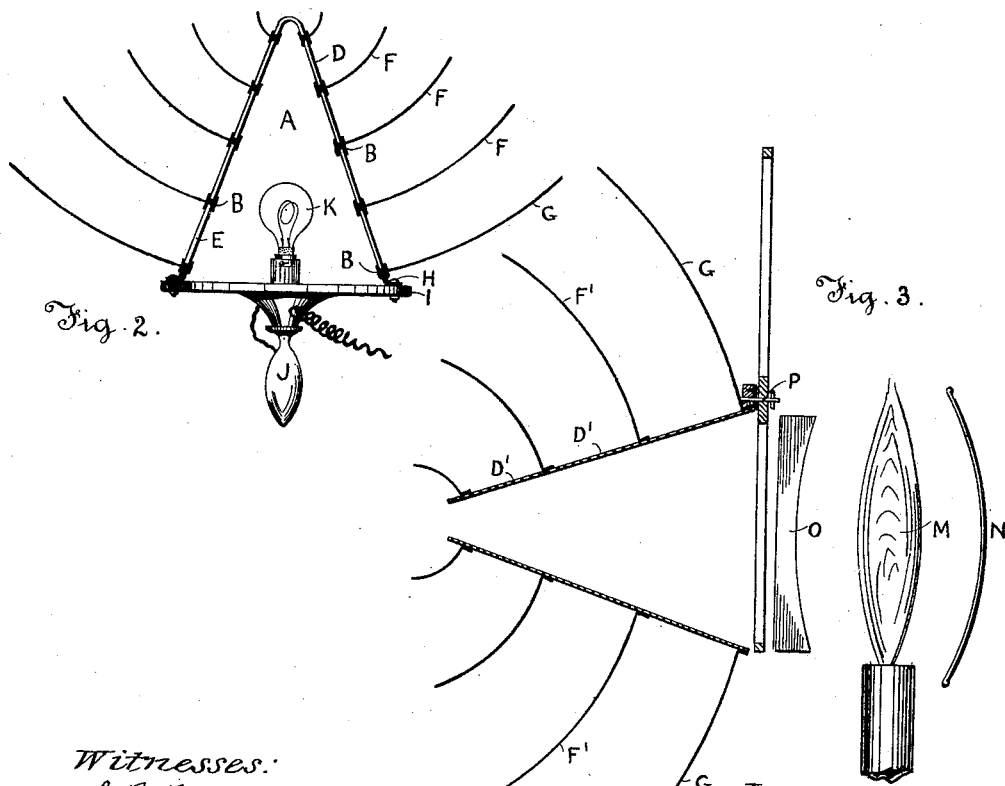
Witnesses:
Inventors:
William Jordan
Edward Broadbridge Jr.
By Richards
their Attorneys.

UNITED STATES PATENT OFFICE.

WILLIAM JORDAN AND EDWARD BROADBRIDGE, JR., OF BRIGHTON, ENGLAND.

ILLUMINATING DEVICE FOR STAGE-SCENERY AND FOR OTHER PURPOSES.

SPECIFICATION forming part of Letters Patent No. 482,362, dated September 13, 1892.

Application filed November 21, 1891. Serial No. 413,314. (No model.) Patented in England February 10, 1891, No. 2,399.

*To all whom it may concern:*

Be it known that we, WILLIAM JORDAN, mechanical engineer, of 27 King's Road, and EDWARD BROADBRIDGE, Jr., furniture dealer, of 2 Powe's Square, Brighton, in the county of Sussex, England, subjects of the Queen of Great Britain, have invented certain new and useful Improvements in Illuminating Devices for Stage-Scenery and for other Purposes, (for which we have made application for Letters Patent in Great Britain, No. 2,399, dated February 10, 1891, sealed January 19, 1892,) of which the following is a specification.

Our invention is intended to provide a method of and means for producing brilliant effects in stage scenery, decoration, and devices used in connection with dramatic and other entertainments, the said invention being also applicable for illuminating or decorative purposes of various kinds—such as *fêtes*, garden-parties, house decoration or illumination—and is adapted for a variety of purposes.

Our invention mainly consists in so arranging (with an illuminating agent hereinafter described) certain devices that the rays of light shall be received from the rear, passed between the elements of the devices, and shall be reflected plain or variously tinted to and from their burnished or equivalently prepared surfaces before finally emerging in a forward direction.

The objects or devices to which our illuminating effects are applied may be of any shape and size suitable for the purpose, such as trees, shrubs, shells, flowers, jewelry, but preferably such as may be conveniently grouped. In other cases a single flower—such as a rose or the like, or a bouquet of flowers to be carried in the hand—may be advantageously employed.

For the purpose of more fully explaining the nature of our said invention and the manner in which the same may be carried into practical effect we refer to the accompanying two sheets of drawings and to the letters of reference marked thereon.

We have shown as an illustration of the many different effects or devices to which our invention may be applied the representation of a full-blown flower—for instance, of a reddish tint—surrounded at its base by, say, green leaves.

Figure 1 is a view somewhat out of shape or proportion, so as to more clearly show the construction of an artificial flower or bouquet with the illuminating device arranged to be carried by hand if constructed on a small scale; but the same arrangement would be equally applicable to a larger and fixed device. Fig. 2 is a sectional elevation showing an arrangement for a hand-carried bouquet or flower fitted with an ordinary electric light. Fig. 3 is a diagram showing a different arrangement for fixed or set pieces capable of illuminating the device with a succession of different-colored lights.

In constructing a flower such as is represented by Figs. 1 and 2 we provide a cone-shaped frame A, of metal or suitable material, either circular, square, octagonal, or the like on plan. This frame is constructed of several rings or flat bars B, secured together by vertical rods or bars, the spaces between being filled in by glass or other translucent material of any desired or convenient color. For instance, in the example shown the upper spaces are filled in with, say, red glass D D D, and the lower space with, say, green glass E E or the glasses may be in one piece for each section or division circular on plan, tapering upward and fitting into sockets in the ribs B, the whole being held together and secured by straps, wires, or clamps.

To the ribs or bars B we attach the leaves or petals F of the flower or device, and these may be formed of bright metal or of any material faced with tin-foil, silver-leaf, or any agent capable of reflecting light. The leaves may, if desired, be painted with different tints.

In the example shown the upper metallic devices F, branching or spreading outward from the ribs or bars B, are intended to represent, say, the petals of a poppy and the lower ones G the green leaves of the same flower.

It will be seen that the frame when filled in with glass or other translucent material forms a chamber A. The base of the frame may be formed with a flange H, which may be secured to a base or carrier I, to which may be attached a handle J for the purpose of holding the device.

On the base or carrier I we may mount an ordinary electric-light bulb K for the purpose of illumination, the wires leading to a battery in any convenient position, carried on the person of the holder, as will be well understood.

Referring to the device as illustrated by Figs. 1 and 2 and the construction of which we have described, it will be seen that before the electric current is switched on the device presents the appearance of a white or golden flower, according to the nature of the material of which the parts F and G are composed, and may be illuminated or not from the front in the ordinary way by lime or other light; but as soon as the electric current is switched on and the light within the chamber A in operation the stage or room may be darkened or the light reduced, when the light in the upper parts D D D passes through the red glasses and is reflected from point to point and along the surface front and back of the petals F, producing a charming effect. At the same time the light, passing through the lower glasses E E, diffuses a green glow along the lower leaves G.

In Fig. 3 we show a method of illuminating a large set piece by one color only or by a succession of different colors, and in this case the light is fixed behind the chamber A, and the rays of an ordinary gas-jet M are projected into the chamber by a reflector N, and, if desired, through a lens O, in front of which may be placed a wheel pivoted at P and divided into two, three, or more parts by cross-bars, each of these divisions being filled with a different-colored glass or the like. In this arrangement the spaces D' E' between the ribs or bars B' may be open or filled with clear glass.

Although we have described our invention in connection with the representation of a flower and for a hand-carried and a set or fixed device, it is capable of application to a great variety of objects and groups for stage effect or for illuminations and the like—such as an illuminated grotto or for illuminated flowers or groups in gardens, parks, and the like. For all these purposes we use the variously-shaped diminishing or equivalent chambers or frames, so long as the rays of light, tinted or otherwise, shall be received and scattered, as above described. The devices may be illuminated by any description of illuminating agent—such as candles, oil-lamps, night-lights, gas, or electricity.

We claim—

1. In a device of the character described, the combination, with a succession of ribs or bars of varying diameters and pieces of translucent material between said ribs, of a light within said chamber, a representation of flowers, shrubs, or analogous matters surrounding the same and upon which the light is diffused, and a handle whereby the same may be carried, substantially as set forth.

2. In a device of the character described, the combination, with a conical chamber or frame provided with a succession of ribs or bars of varying diameters and pieces of differently-colored translucent material between said ribs, of a light within said chamber, a representation of flowers, shrubs, or analogous matters surrounding the same and upon which the light is diffused from the light.

3. In a device of the character described, the combination, with a conical frame or chamber and a representation of flowers surrounding the same, of means for causing light of different shades to be reflected thereon, substantially as set forth.

WILLIAM JORDAN.
EDWARD BROADBRIDGE, JR.

Witnesses:
   H. D. WARNE,
*Consular Agent of the United States of America at Brighton, England.*
   SAMUEL WHITE,
24 *Middle Street, Brighton, Solicitor's Clerk.*